March 16, 1948. R. E. ADAMS 2,437,669
LATERALLY-CUTTING ROTARY CYLINDRICAL SAW
Filed May 20, 1946
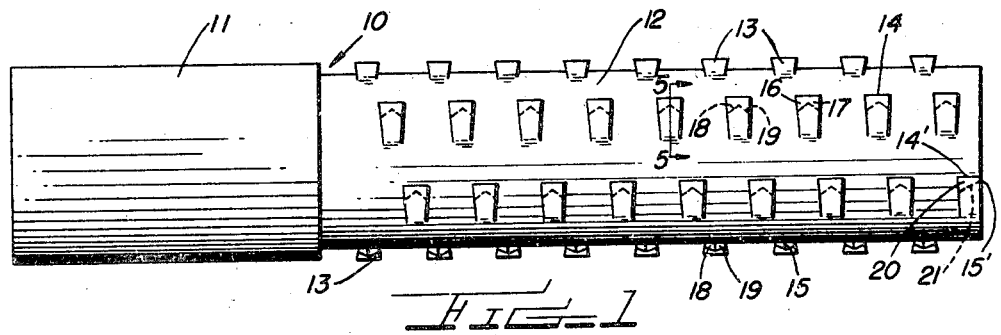
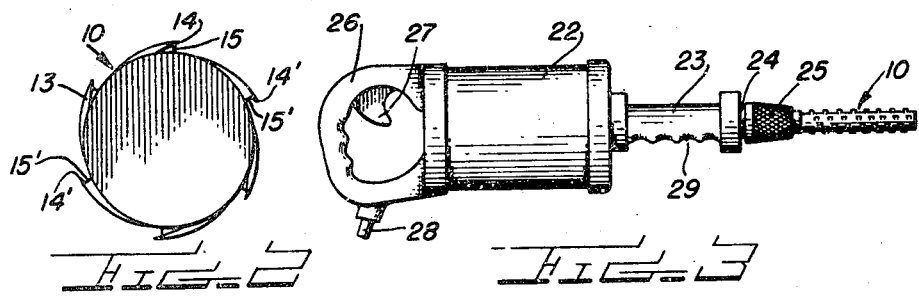
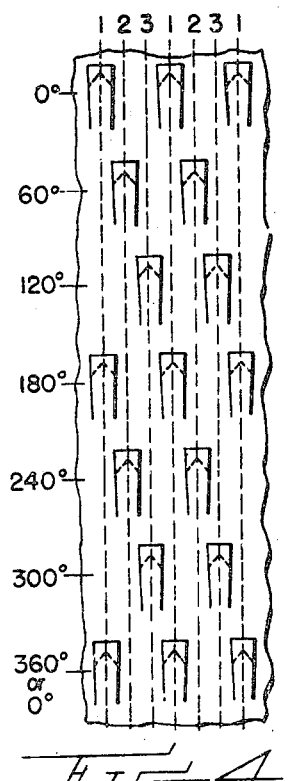
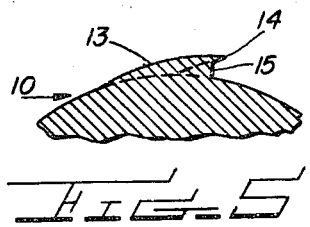
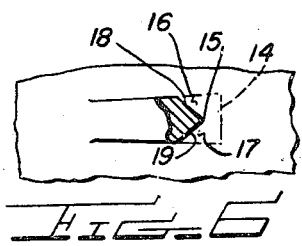
INVENTOR
ROBERT E. ADAMS
BY Adams and Bush
ATTORNEYS Patented Mar. 16, 1948

2,437,669

UNITED STATES PATENT OFFICE 2,437,669

LATERALLY-CUTTING ROTARY
CYLINDRICAL SAW

Robert E. Adams, McDonough, Ga., assignor of one-half to Richard P. Bernhardt, McDonough, Ga.

Application May 20, 1946, Serial No. 670,978

2 Claims. (Cl. 143—133)

This invention relates to rotary saws and has more particular reference to high speed power driven rotary saws.

One object of the invention is to provide a rotary saw having non-clogging teeth.

Another object of the invention is to provide a rotary saw adapted to be used for all types of cutting, shaping, milling or other sawing operations ordinarily done in a wood working shop.

Another object of the invention is to provide a portable high speed power driven rotary saw in which the cutting tool is readily removed and replaced.

Another object of the invention is to provide a rotary saw in which the cutting teeth are so arranged on the surface of the body that no part of the wood is left uncut in the path of the advancing saw.

A further object of the invention is to provide a rotary saw which is a rugged and well balanced cutting tool, efficient in operation and easily manipulated with respect to the work.

With the foregoing and other objects in view, the invention consists in the construction, combination and arrangement of parts hereinafter described and illustrated in the accompanying drawing, in which:

Fig. 1 is an enlarged side elevation of the rotary saw shown in Fig. 3;

Fig. 2 is an end view of the rotary saw shown in Fig. 1;

Fig. 3 is a side elevation of a portable power driven rotary saw in accordance with this invention;

Fig. 4 is a fragmentary diagrammatic, development view of the rotary saw, showing the arrangement of the teeth;

Fig. 5 is a sectional view, taken on the line 5—5 of Fig. 1, showing a tooth in vertical cross section; and Fig. 6 is a plan view, with a part broken away, of the tooth shown in Fig. 5.

In Fig. 1, there is shown a rotary saw 10 comprising a substantially cylindrical member having an attaching portion 11 adapted to be detachably connected to a power driven tool and a cutting portion 12 provided on its outer surface with a plurality of circumferentially spaced, longitudinally extending rows of integral tangentially projecting saw teeth 13.

The rotary saw is preferably made of tool steel with the cutting edges of the teeth tempered and hardened. The particular shape of the teeth is clearly shown in Figs. 1, 2, 5 and 6. In the particular embodiment shown, each tooth 13 is formed with a width greater than its height and has the lower portion of the base of the tooth along its forward edge cut away to form a horizontal cutting edge 14 and having diverging side portions of the lower portion of the base below the cutting edge 14 cut away to form a V-shaped substantially radial or vertical cutting edge 15 spaced rearwardly and intermediately of the ends of the cutting edge 14. As clearly shown in Fig. 5, the horizontal cutting edge 14 is spaced angularly forward of and radially above the vertical cutting edge 15. This construction results in the top portion of the tangentially projecting tooth which carries the horizontal cutting edge 14 projecting over the horizontal cutting edge 15 and the diverging cut away portions with the cut away portions forming pockets or recesses 16 and 17 having diverging side walls 18 and 19.

A rotary saw provided with teeth constructed as set forth above is non-clogging, particularly when used with a power driven high speed tool. During the cutting operation, the teeth cut for one-half of their revolution and sweep through air for the other half. The chips cut by the horizontal cutting edges of the teeth will be bisected by the vertical cutting edges and the pieces will be shunted clear of the teeth by the diverging side walls of the vertical V-shaped cutting edges. These side walls diverge at an angle which offers the minimum obstruction to the chips as they are passed to the sides of and clear the teeth. The chips are subsequently thrown clear of the saw by centrifugal force.

The size and number of the teeth in relation to the length and diameter of the cylinder is determined by the use for which the particular rotary saw is designed. The particular arrangement of the teeth on the outer surface of the cylinder is diagrammatically shown in Fig. 4, where a portion of the cylinder is developed. Here the length of the cylinder is divided into segments, indicated by the numerals 1, 2, 3, 1, 2, 3, 1. In the particular embodiment of the invention shown, two teeth are formed in each segment and are spaced 180° apart with the teeth in each segment having a slight lateral overlap of the teeth in each adjacent segment. This insures that no part of the wood is left uncut as the saw revolves. In addition, the teeth in each segment are angularly spaced from those in the preceding segment. In this particular embodiment of the invention, they are shown as being angularly spaced by 60°. In the particular arrangement shown, there are six parallel, horizontally extending rows of teeth angularly spaced 60° apart.

In order that the rotary saw may be used to cut grooves, it is preferable that the teeth in the last segment be constructed with the vertical V-shaped cutting edge 15' located at the outer edge of the horizontal cutting edge 14' rather than intermediate of its ends, as it is in the remaining teeth. The vertical cutting edge 15' is flush with and in alignment with the vertical end of the cylinder, and only one pocket 20 having a slanting side wall 21 is formed under the overhang of the top portion of the tooth by the cut out portion. This construction is clearly shown in Figs. 1 and 2. The rotary saw is designed to be used with a high speed power driven tool. In Fig. 3, there is shown a portable high speed power driven rotary saw constructed in accordance with this invention and comprises a housing 22 for a motor, which may be either electric or turbine, in the particular embodiment shown, the motor is a high speed electric motor; a housing 23 attached to the motor housing in which an extended end 24 of the rotor shaft is housed; and the rotary saw 10 detachably connected to the end 24 of the rotor shaft, as by means of a collet 25. The motor housing 22 is provided with a handle grip 26 which houses a trigger switch 27 for controlling the supply of energy to the motor. An extension cord 28 projects from the handle grip 26 and is adapted to be connected to a source of electrical supply, not shown. Suitably secured to the motor housing 22 is the housing 23 in which is mounted the extended end 24 of the rotor shaft. The housing 23 is provided with a suitable hand grip 29.

The operation of the device is as follows:

The operator places one hand on the motor handle grip 26 and the other hand on the hand grip 29 adjacent to the rotary saw. The trigger switch 27 is moved to start the motor and, with the rotary saw rotating at a high speed, preferably 15,000 revolutions per minute, or better, it is pushed into the material to be cut. It is this high speed, plus the particular construction of the teeth that prevents the saw from clogging.

Obviously, the invention is not restricted to the particular embodiment thereof herein shown and described. Moreover, it is not indispensible that all of the features of the invention be used conjointly, since they may be employed advantageously in various combinations and subcombinations.

What is claimed is:

1. A rotary saw comprising a substantially cylindrical member having a plurality of cutting teeth formed on its outer surface, each of said teeth being formed with its outer surface projecting tangentially from the outer surface of said cylindrical member and having its lower forward base portion cut away to define a substantially radial V-shaped cutting edge, and having its upper forward base portion projecting forwardly over the V-shaped edge and the cut away portions to form a pair of diverging side pockets and having its outer edge formed as a horizontal cutting edge spaced angularly forward of and radially above said substantially radial cutting edge.

2. A rotary saw as set forth in claim 1, wherein said teeth are formed on the outer surface of said cylinder in a plurality of circumferential rows, each row including at least two teeth and being located with respect to the preceding adjacent row so as to provide a slight overlap in the paths of travel of the teeth in said adjacent row, whereby no portion of the wood in the path of the rotary saw is left uncut and wherein the substantially radial cutting edges of the teeth in the circumferential row contiguous with the outer end of the cylinder are located under the outer ends of the horizontal cutting edges of the teeth with the outer side walls of the teeth in alignment with the end wall of the cylinder.

ROBERT E. ADAMS.

REFERENCES CITED

The following references are of record in the file of this patent:

UNITED STATES PATENTS

| Number | Name | Date |
|---|---|---|
| 212,516 | Schleicher | Feb. 18, 1879 |
| 697,875 | Panse | Apr. 15, 1902 |
| 1,002,678 | Grondahl | Sept. 5, 1911 |
| 1,886,952 | Hodeaux | Nov. 8, 1932 |
| 2,022,155 | Sawyer | Nov. 26, 1935 |
| 2,261,230 | Cox et al. | Nov. 4, 1941 |
| 2,301,264 | Emery | Nov. 10, 1942 |